(12) United States Patent
Chari et al.

(10) Patent No.: US 7,016,328 B2
(45) Date of Patent: Mar. 21, 2006

(54) METHOD FOR ALLOWING A CLIENT TO ACCESS A WIRELESS SYSTEM

(75) Inventors: Amalavoyal Chari, San Mateo, CA (US); Devabhaktuni Srikrishna, San Mateo, CA (US)

(73) Assignee: Tropos Networks, Inc., Sunnyvale, CA (US)

( * ) Notice: Subject to any disclaimer, the term of this patent is extended or adjusted under 35 U.S.C. 154(b) by 21 days.

(21) Appl. No.: 10/602,179

(22) Filed: Jun. 24, 2003

(65) Prior Publication Data

US 2004/0264435 A1    Dec. 30, 2004

(51) Int. Cl.
*H04Q 7/00* (2006.01)
(52) U.S. Cl. .................. 370/331; 370/389; 370/395.54
(58) Field of Classification Search ................ 370/389, 370/310, 310.1–310.2, 312, 351, 314, 352, 370/328, 329, 331, 332, 336, 338, 345, 345.52, 370/442, 355, 353, 356, 326, 238, 469, 395.54; 455/433, 436, 437, 439, 442, 445; 709/238, 709/229, 226, 230
See application file for complete search history.

(56) References Cited

U.S. PATENT DOCUMENTS

| | | | | |
|---|---|---|---|---|
| 5,898,679 A * | 4/1999 | Brederveld et al. ......... | 370/315 |
| 6,298,053 B1 | 10/2001 | Flammer, III et al. | |
| 6,427,170 B1 * | 7/2002 | Sitaraman et al. .......... | 709/226 |
| 6,473,413 B1 * | 10/2002 | Chiou et al. ................ | 370/331 |
| 6,535,493 B1 * | 3/2003 | Lee et al. .................... | 370/329 |
| 6,542,510 B1 * | 4/2003 | Fujimori et al. ............ | 370/402 |
| 6,728,232 B1 * | 4/2004 | Hasty et al. ................. | 370/338 |
| 6,763,007 B1 * | 7/2004 | La Porta et al. ............ | 370/331 |
| 6,795,857 B1 * | 9/2004 | Leung et al. ............... | 709/224 |
| 2002/0138628 A1 * | 9/2002 | Tingley et al. .............. | 709/227 |
| 2002/0142771 A1 * | 10/2002 | Saifullah et al. ............ | 455/436 |
| 2003/0046413 A1 * | 3/2003 | Sakakura ..................... | 709/229 |
| 2003/0185233 A1 * | 10/2003 | Ji et al. ....................... | 370/466 |
| 2003/0202497 A1 * | 10/2003 | Csapo ......................... | 370/338 |
| 2003/0202505 A1 * | 10/2003 | Ozugur ....................... | 370/352 |
| 2003/0212794 A1 * | 11/2003 | Touati et al. ................ | 709/226 |
| 2003/0233580 A1 * | 12/2003 | Keeler et al. ................ | 713/201 |
| 2004/0066759 A1 * | 4/2004 | Molteni et al. ............. | 370/329 |
| 2004/0081122 A1 * | 4/2004 | Koodli et al. ............... | 370/329 |
| 2004/0109472 A1 * | 6/2004 | Choyi et al. ................ | 370/466 |
| 2004/0114559 A1 * | 6/2004 | Wang ......................... | 370/338 |

* cited by examiner

*Primary Examiner*—Chau Nguyen
*Assistant Examiner*—Ian N. Moore
(74) *Attorney, Agent, or Firm*—Brian R. Short

(57) ABSTRACT

An apparatus and method for allowing a client to access a wireless system is disclosed. The system includes at least a first wireless access node. The method includes the first wireless access node detecting a client seeking access to the system. The first wireless access node being able to wirelessly connect to a back bone network. Client information is obtained. The first wireless node provides the client a communication path to and from a destination. The communication path is able to include wired and wireless communication links. Routing of information through the communication path between the client and the destination is aided based upon detection of the client. The wireless connection between the first access node and the back bone network can include at least one wireless hop between the first access node and a third access node.

70 Claims, 10 Drawing Sheets

THE FIRST WIRELESS ACCESS NODE DETECTING A CLIENT SEEKING ACCESS TO THE SYSTEM, THE FIRST WIRELESS ACCESS NODE ABLE TO WIRELESSLY CONNECT TO A BACK BONE NETWORK

310

OBTAINING CLIENT INFORMATION

320

THE FIRST WIRELESS NODE PROVIDING THE CLIENT A COMMUNICATION PATH TO AND FROM A DESTINATION, THE COMMUNICATION PATH ABLE TO INCLUDE WIRED AND WIRELESS COMMUNICATION LINKS

330

AIDING IN A ROUTING OF INFORMATION THROUGH THE COMMUNICATION PATH BETWEEN THE CLIENT AND THE DESTINATION BASED UPON DETECTION OF THE CLIENT

METHOD FOR ALLOWING A CLIENT TO ACCESS A WIRELESS SYSTEM

FIELD OF THE INVENTION

The invention relates generally to wireless communications. More particularly, the invention relates to a method of wireless accessing.

BACKGROUND OF THE INVENTION

Packet networking is a form of data communication in which data packets are routed from a source device to a destination device. Packets can be networked directly between a source node and a destination node, or the packets can be relayed through a number of intermediate nodes.

A wireless network can include a wireless device being connected to a network through a base station that is wired to the network. The wireless device can transmit data packets that are received by the base station and then routed through the network. The wireless network can include many base stations that are each wired to the network.

A wireless device may be mobile, and therefore, require access to more than one base station. When the wireless device travels from an access range of a first base station to an access range of a second base station, a handoff must occur as the connection between the wireless device and the first base station stops, and a new connection between the wireless device and the second base station begins.

An advanced mobile phone system (AMPS) employs a centrally coordinated approach to accomplish handoffs as a mobile phone roams from on cell (defined by a base station) to another cell. When a connection to a mobile phone is to be made, a mobile telephone switching office (MTSO) attempts to locate the mobile phone by instructing all cell sites to page the mobile phone. If the MTSO is connected to a large number of cell sites, and there are a large number of mobile phones, the number of pages is substantial. Handoffs are requested by the mobile device (phone). This approach requires a centralized control which makes it non-scalable. Additionally, this approach requires intelligence within the mobile device so that the device can signal the MTSO when a handoff is necessary. Additionally, routing can be inefficient.

Another approach to wireless accessing is Mobile IP. Mobile IP requires the existence and participation of the following network entities: a Home Agent (HA), a Foreign Agent (FA) and a Mobile Node (MN). In addition, there is a Correspondent Host (CH) that seeks to exchange traffic with the Mobile Node (MN). The Home Agent is charged with keeping track of the physical location of the MN at any point in time and establishing and maintaining a tunnel to an FA near the MN. Any data traffic arriving at the HA for the MN is routed through the tunnel to the FA. The FA is required to register new MN's and inform the corresponding HA, set up and maintain a tunnel for each MN to its HA and forward data traffic between the MN and its HA through the tunnel. The MN is responsible for Agent Discovery (detecting the local FA) and Registration (registering with the local FA). This approach has several limitations.

First of all, two network entities (HA and FA) are required to be equipped with Mobile IP software for operation of the protocol. Mobile IP MN software has to be loaded on the client device. The HA may be physically far away from the FA. Therefore, considerable latencies may be incurred in routing the data traffic over the tunnel. In particular, this means that applications with low latency requirements such as voice or video will not be well served by this approach. This also approach suffers from a "triangle routing problem". That is, if the Home Agent is not on the direct path between the Correspondent Host (CH) and the FA, then data traffic between the CH and the MN will travel a circuitous path, resulting in increased latencies and traffic inefficiencies. Packets received for the MN before the MN has registered at the new FA are discarded by the HA. In the case of TCP sessions, these lost packets may trigger a Slow Start/Congestion Avoidance phase that leads to dramatically reduced end-to-end throughput. While the route switches between forwarding and the final route, some out-of-order packets may be generated, affecting the performance of TCP-based applications as well as multimedia traffic that rely on mostly-in-order packet delivery and reasonably consistent end-to-end performance. While this approach may be expected to work sufficiently well for macro-mobility scenarios, the overhead of routing traffic through a tunnel may be overkill for a situation where a mobile device is roaming quickly within a small geographic area (micro-mobility). These two application scenarios are sometimes also described as nomadicity and mobility.

A wireless mesh network includes wireless access nodes interconnected by a mesh of wireless links. Generally, mesh networks suffer from the same handoffs limitations as the mobile phone system. More specifically, handoffs require specific hardware and software within the mobile device to support handoffs within the wireless network.

It is desirable to have a wireless mesh network that allows wireless handoffs of a client between access nodes of the mesh network that does not require the client to include special hardware or software. The mesh network should support nomadicity as well as mobility. It is desirable that the network be able to track clients as the clients roam through the network. Additionally, the network should be fault tolerant.

SUMMARY OF THE INVENTION

The invention includes an apparatus and method for allowing a client to access a wireless system. The wireless mesh network that allows wireless handoffs of a client between access nodes of the mesh network and does not require the client to include special hardware or software. The mesh network supports nomadicity as well as mobility. The network can track clients as the clients roam through the network, and the network is fault tolerant.

A first embodiment of the invention includes a method of allowing a client to access a wireless system. The system includes at least a first wireless access node. The method includes the first wireless access node detecting a client seeking access to the system. The first wireless access node being able to wirelessly connect to a back bone network. Client information is obtained. The first wireless node provides the client a communication path to and from a destination. The communication path is able to include wired and wireless communication links. Routing of information through the communication path between the client and the destination is aided based upon detection of the client. The wireless connection between the first access node and the back bone network can include at least one wireless hop between the first access node and a third access node.

Another embodiment of the invention includes a method that further includes the client roaming from the first node to a second access node. The second wireless access node detects the client seeking access to the system. The second wireless access node is able to connect to the back bone network. Client information is obtained. The second wireless node provides the client a communication path to and from the destination. The communication path is able to include wired and wireless communication links. Routing of information through the communication path between the client and the destination is aided based upon detection of the client. The wireless connection between the second access node and the back bone network can include at least one wireless hop between the second access node and a fourth access node.

Other aspects and advantages of the present invention will become apparent from the following detailed description, taken in conjunction with the accompanying drawings, illustrating by way of example the principles of the invention.

BRIEF DESCRIPTION OF THE DRAWINGS

FIG. 3 is a flow chart that includes acts according to an embodiment of the invention.

DETAILED DESCRIPTION

Figure 1:
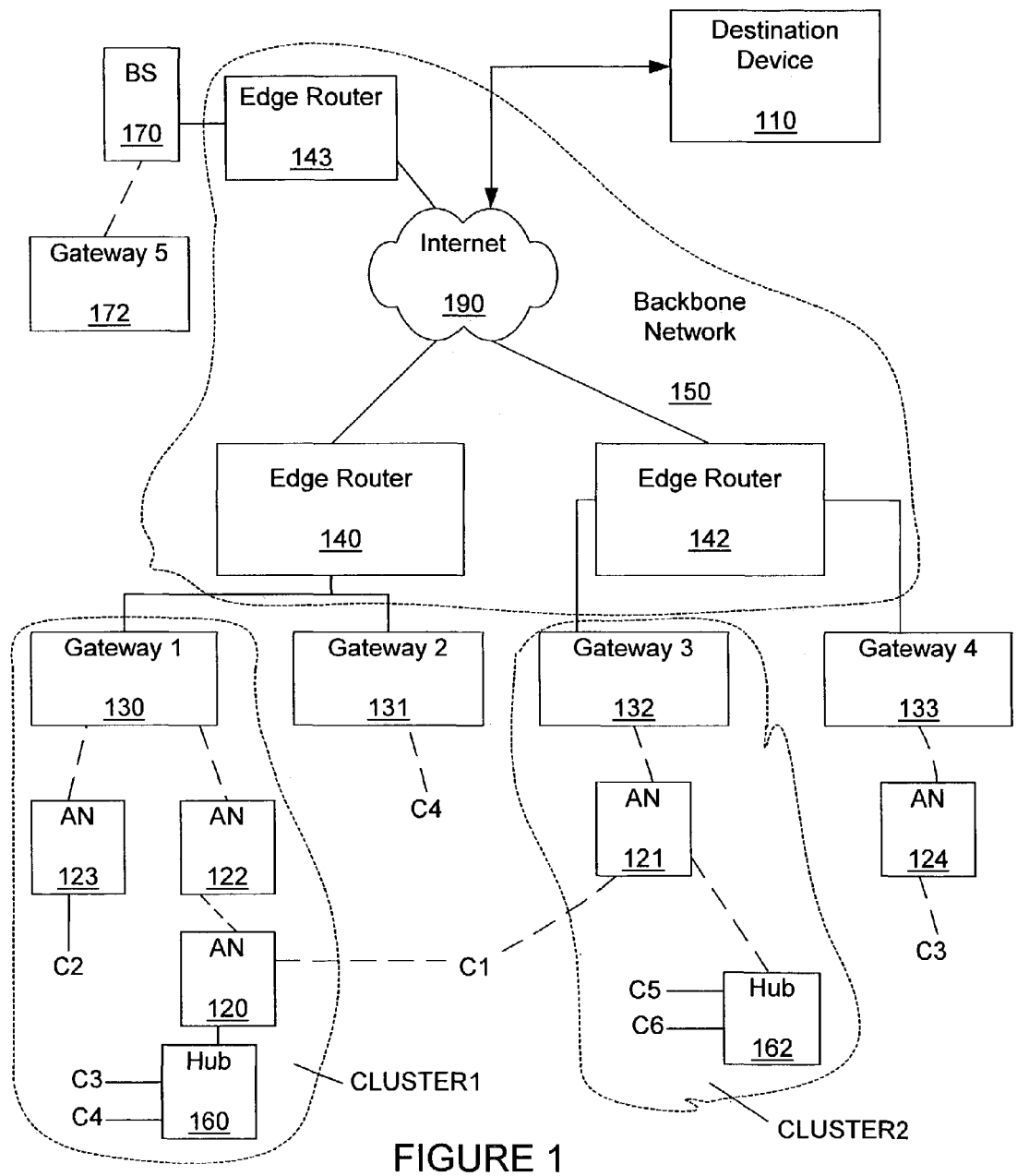
FIG. 1 shows a wireless mesh network that can include embodiments of the invention.

As shown in the drawings for purposes of illustration, the invention is embodied in an apparatus and method for wireless roaming within a wireless mesh network.

FIG. 1 shows a wireless mesh network that can include embodiments of the invention. Generally, the invention includes allowing a client C1 to communicate with a destination device 110, as the client C1 roams from wireless access with a first access node 120 to wireless access with a second access node 121. The wireless access nodes 120, 121 generally belong to a wireless mesh network.

The wireless mesh network as shown in FIG. 1 includes a first gateway 130, a second gateway 131, a third gateway 132 and a fourth gateway 133. Generally, the gateways 130, 131, 132, 133 are connected through wires to a first edge router 140 and a second edge router 142 of a backbone network 150. The edge routers 140, 141 provide wired connections to an internet network 190. The destination device 110 is connected to the internet 190, thereby providing a communications path between the gateways 130, 131, 132, 133 and the destination device 110.

As previously described, the gateways 130, 131, 132, 133 belong to a wireless mesh network. The wireless mesh network can additionally include many wireless access nodes, including the previously mentioned first and second access nodes 120, 121. The wireless mesh network can additionally include a third access node 122, a fourth access node 123 and a fifth access node 124.

As shown in FIG. 1, the third and fourth access nodes 122, 123 are wirelessly connected to the first gateway 130. The single wireless link between the first gateway 130 and the third and fourth access nodes 122, 123 can be designated as a single hop. The first access node 120 is wirelessly connected to the third access node 122. The double wireless link between the first gateway 130 and the first access node 120 can be designated as a double hop.

The connections or links between access nodes, and between access nodes and other devices can be either wired or wireless. For example, FIG. 1 shows a hub 160 connected to the first access node through a wire. A second hub 162 is shown to be wirelessly connected to the second access node 121.

The access nodes and devices of a gateway can define a cluster. For example, a first cluster (CLUSTER1) of FIG. 1 includes first gateway 130, the first, third and fourth access nodes 120, 122, 123 and the hub 160. A second client C2 can be connected to the first cluster through the fourth access node 123, third and fourth clients C3, C4 can be connected to the first cluster through the first hub 160.

A second cluster (CLUSTER2) can include the third gateway 132, the second access node 121, and the second hub 162. A fifth client C5 and a sixth client C6 can be connected to the second cluster through the second hub 162.

A third cluster can include the second gateway 131 that is wirelessly connected to a fourth client C4.

A fourth cluster can include the fourth gateway 133 that is wirelessly connected to a fifth access node 124. The fifth access node 124 can be wirelessly connected to a third client C3.

As previously described, the invention allows a client (the first client C1 as shown in FIG. 1) to roam between access nodes. The access nodes can be from a common cluster, from different clusters, and as will be described later, from different clusters having different subnets.

A client generally can include a laptop computer, a personal digital assistant (PDA), a cell-phone, or any other device that includes as interface card adaptable for use with the mesh network of the invention.

An access node generally includes any point of attachment of a client with the mesh network. The access node can be a wireless access point, a wired access point, a router, a hub, a gateway, or any other networking device capable of attachment to a client.

A downlink interface is a network interface (logical or physical) that attaches an access node to a client device. An access node can have more that one downlink interface. Tunnel interfaces (described later) generally implement IP encapsulation, and are treated as downlink interfaces. All other interfaces other than downlink interfaces are termed uplink interfaces.

A gateway is a network entity that maintains an address mapping table for each client. As will be described, the address mapping table generally includes a MAC-IP address mapping for the client devices. A single gateway corresponds with each access node. However, each gateway can service several access nodes.

A cluster is defined as a set of access nodes that are serviced by a single gateway.

A gateway can be an access node. In this case, the gateway generally includes one or many more downlink interfaces. An embodiment includes the gateway being an edge router between wired and wireless networks. This embodiment generally includes the gateway being at a cluster boundary. Here, the cluster is defined as the maximal set of access nodes and client devices serviced by the gateway.

An access network is defined by a collection of networked clusters.

A backbone network is generally defined as all network elements that are not a part of the access network.

An edge router is generally a network element that is directly connected to a gateway through a wired or wireless connection. The edge router is not a member of a cluster. The edge router implements routing logic to aid in the forwarding and routing of packets.

The internet is a global network connecting millions of computers, in which control of the network is decentralized. Generally, each internet computer is independent, and referred to as a host.

A subnet is a portion of a network that shares a common address component. On TCP/IP networks, subnets are defined as all devices whose IP addresses have the same prefix. For example, all devices with IP addresses that start with 100.100.100 are part of the same subnet. Dividing a network into subnets is useful for both security and performance reasons.

Figure 2:
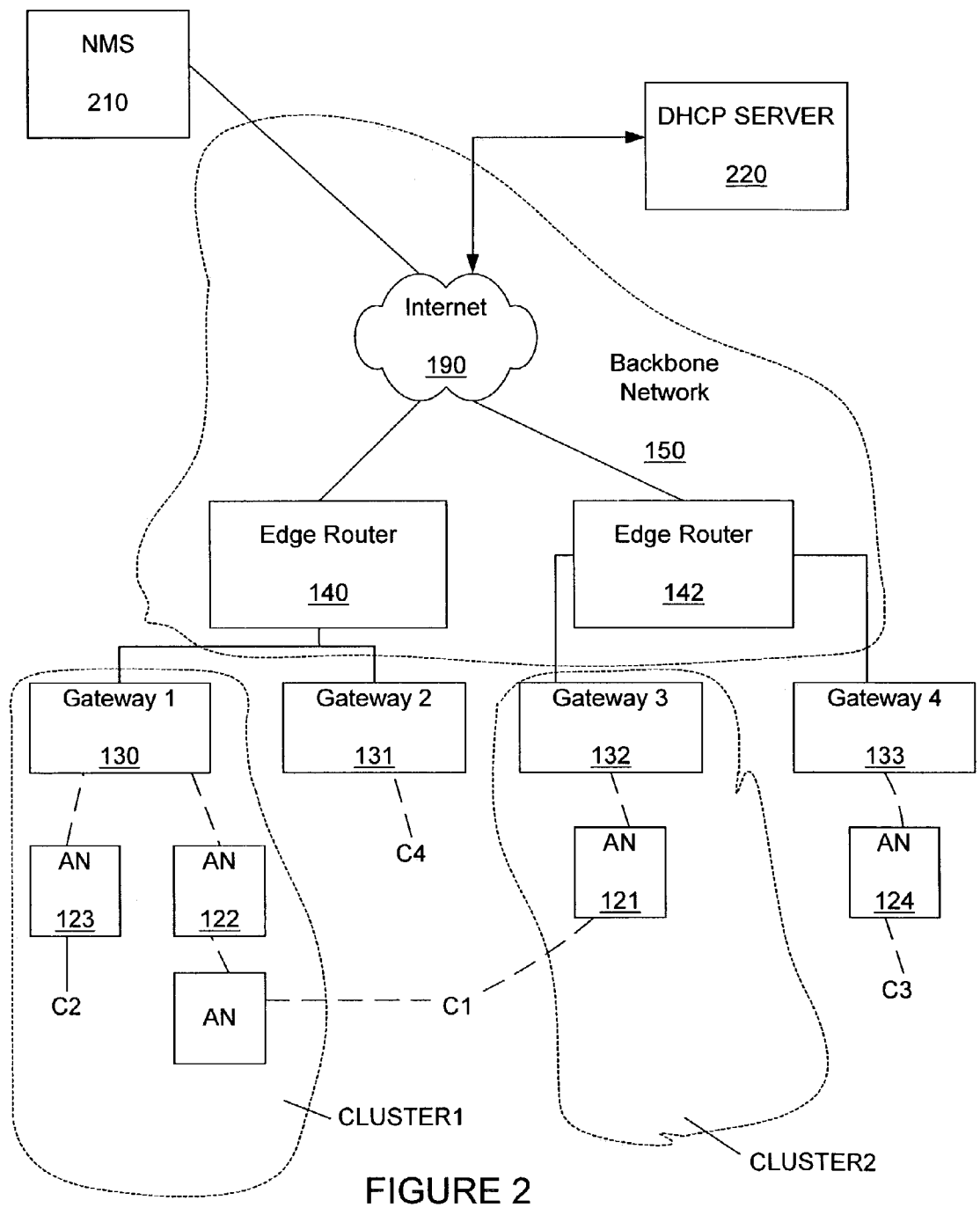
FIG. 2 shows another wireless mesh network that can include embodiments of the invention.

FIG. 2 shows another wireless mesh network that can include embodiments of the invention. FIG. 2 includes the addition of a network management system (NMS) 210 and a DHCP server 220.

The NMS 210 provides management of a wireless mesh network. The NMS 210 can provide network management, address management, monitoring, performance tracking, configuration management and security functions.

The DHCP server dynamically provides IP address assignments to client devices through the dynamic host configuration protocol. The dynamic host configuration protocol is a protocol for assigning dynamic IP addresses to devices on a network. With dynamic addressing, a device can have a different IP address every time it connects with the network. In some systems, the device's IP address can even change while it is still connected. DHCP also supports a mix of static and dynamic IP addresses.

FIG. 3 is a flow chart that includes acts according to an embodiment of the invention. The acts provide a method of allowing a client to access a wireless system. The system includes at least a first wireless access node. The invention provides for roaming without requiring additional hardware or software within the client.

Configurations of the invention include the first wireless access node being a first gateway that is linked to a computer network through a wired connection. Other configurations include the first wireless access node and the second wireless access node belonging to a common cluster. Alternatively, the first wireless access node can belong to a first cluster, and the second wireless access node can belong to a second cluster. The first cluster and the second cluster can belong to a common subnet, or the first cluster can belong to a first subnet and the second cluster can belong to a second subnet.

The wireless connection between the first access node and the back bone network can include at least one wireless hop between the first access node and a third access node. That is, an additional access node can exist between the first access node and the gateway the first access node is connected.

A first act 310 includes the first wireless access node detecting a client seeking access to the system. The first wireless access node is generally able to wirelessly connect to a back bone network.

A second act 320 includes obtaining client information.

A third act 330 includes the first wireless node providing the client a communication path to and from a destination. Generally, the communication path can include wired and wireless communication links.

A fourth act 340 includes aiding in a routing of information through the communication path between the client and the destination based upon detection of the client.

Each of these acts will be described in greater detail.

Detection of a Client

Generally, detecting the client includes detecting a MAC address of the client, and determining an IP address of the client. When a client device is attached to an access network, the MAC address of the client device can be detected. Several different methods can be used to detect the MAC address.

Some Medium Access Control (MAC) protocols include receiving an association request from the client. An embodiment of the invention includes an 802.11b protocol that creates an association between a client device and the corresponding access node. At any given point of time, a client device can only be associated to a single access node. The list of client devices attached to an access node can usually be obtained by querying a network interface card driver within the access node. This method only applies to MAC protocols, such as 802.11b, that create associations between client devices and access nodes and would, for instance, not apply in the case of an Ethernet MAC.

Another embodiment of the invention includes inspection of frames originating from the client device. The frames can include the client device's MAC address as the source MAC address. Inspection of these frames at the access node allows the access node to determine the client device's MAC address. Inspection of each incoming frame at the access node incurs considerable network processing overhead even if there are no new client devices attaching to the downlink interface. Therefore, this method can be inefficient. This method can be made more efficient by only inspecting frames with source MAC addresses not matching a list of known source MAC addresses corresponding to attached client devices that have already been detected. This method of detection can fail if the client device does not generate any traffic.

Another embodiment of the invention includes the access node pinging a broadcast address. More specifically, the access node can periodically ping the broadcast address (255.255.255.255) and inspect the ping responses to determine the MAC and IP addresses of any client devices attached to the downlink interface. TCP/IP stacks of some operating systems do not respond to broadcast pings, and this method may not be reliable.

Another embodiment of the invention includes an attached client device generating ARP requests for hosts on its subnet. These ARP requests can result in the generation of ARP cache entries for the client device on the access node to which the client device is attached. Through an examination of the ARP cache, the access node can determine the MAC addresses (and corresponding IP addresses) of attached client devices. This method has the disadvantage that ARP cache entries on the access nodes are generated only in response to ARP requests from the client device and these are issued only when the client device's ARP cache expires. On many client device operating systems, the ARP cache expiration time can be as long as 20 minutes.

Once the MAC address of the client has been determined, generally the IP address of the client must be determined. Several different methods can be used to detect the client IP address.

Figure 4:
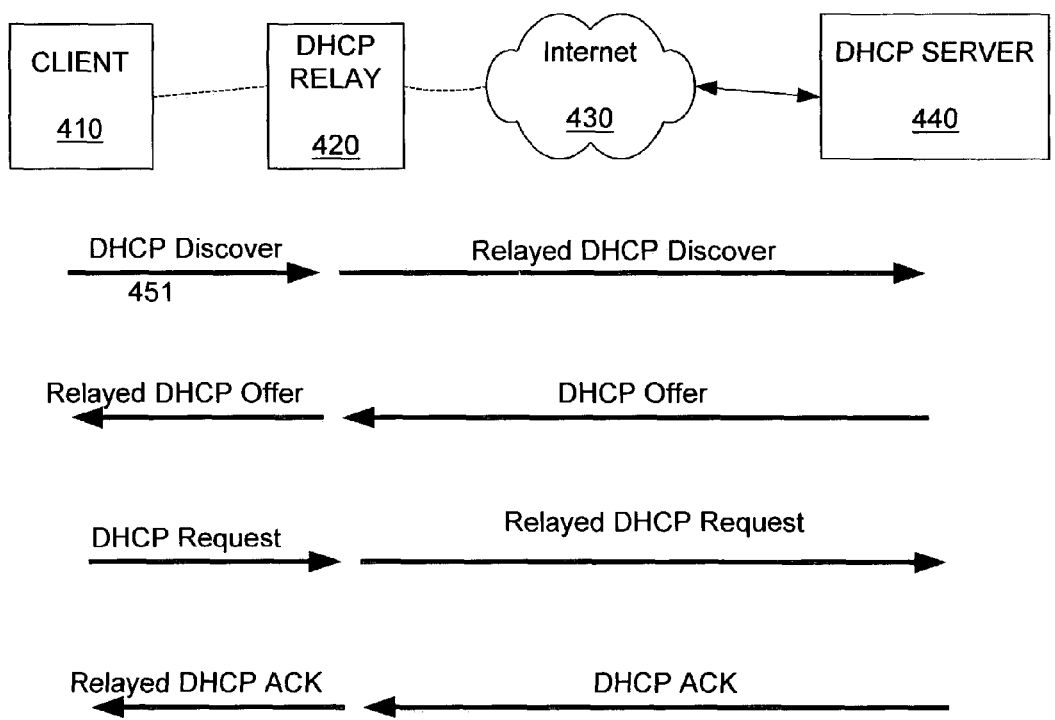
FIG. 4 shows a sequence of events executed during a default gateway determination according to an embodiment of the invention.

FIG. 4 shows a sequence of events during a default gateway determination according to an embodiment of the invention. The gateway determination of FIG. 4 includes interactions between a client device 410, a DHCP relay (typically, an access node) 420, a network 430 and a DHCP server 440.

The client 410 initiates a DHCP discover 451. The DHCP relay 420 relays the DHCP discover through the network 430 to the DHCP server 440. The DHCP server 440 generates a DHCP offer that includes an IP address (IP1) and a default gateway (DG1). The DHCP relays the DHCP offer to the client 410. Upon receiving the DHCP offer, the client 410 generates a DHCP request. Again, the DHCP relay 420 relays the DHCP request to the DHCP server 440. The DHCP server 440 generates an acknowledgement. The client device 410 receives the acknowledgement. The DHCP relay 420 records the IP address and default gateway.

An access node can inspect DHCP acknowledgement packets when a client device performs a DHCP exchange. The DHCP exchange can be either DHCP renewal or DHCP discovery. The access node (running a DHCP server or relay) can inspect the DHCP acknowledgement packets (the fourth leg of the DHCP 4-way handshake) and determine the IP address assigned to the client device's MAC address. This procedure only works when the Client Device originates a DHCP discover or a DHCP request. This can be a rare occurrence during continued operation, but is generally expected behavior for the client device on boot-up. This mechanism is useful in detecting new client devices that have just booted up and are joining the network for the first time.

One or more servers (gateways) on the network can maintain a MAC-address-to-IP-address mapping for all client devices attached to the network. The address mapping can be stored in an address mapping table that can be arranged to be synchronized across all the servers. This address mapping table can be referred to as an AARP Table (AARP=Anti-ARP). ARP is generally is a protocol for the resolution of IP addresses to MAC addresses. Here, anti-ARP (AARP) is a protocol for the resolution of MAC addresses to IP addresses.

An access node can query one of these servers (gateways) to determine the IP address corresponding to the MAC address of one of the Client Devices attached (in communication) to the access node. Generally, the gateway (server) responds with the IP address of the client device (if this entry exists in its AARP Table). If the entry does not exist in the AARP table, the gateway queries other gateways. The gateway generally then responds to the access node with the reply received.

Generally, the access node functions as an AARP Client. A Gateway acts as an AARP Server when responding to AARP Requests from an Access Node or a Gateway and as an AARP Client when sending AARP Requests to another Gateway. The service requested is the determination of the IP address corresponding to a given MAC address. Therefore, the service request is termed AARP (Anti-ARP), as opposed to ARP which is a protocol for the resolution of IP addresses to MAC addresses.

Figure 5:
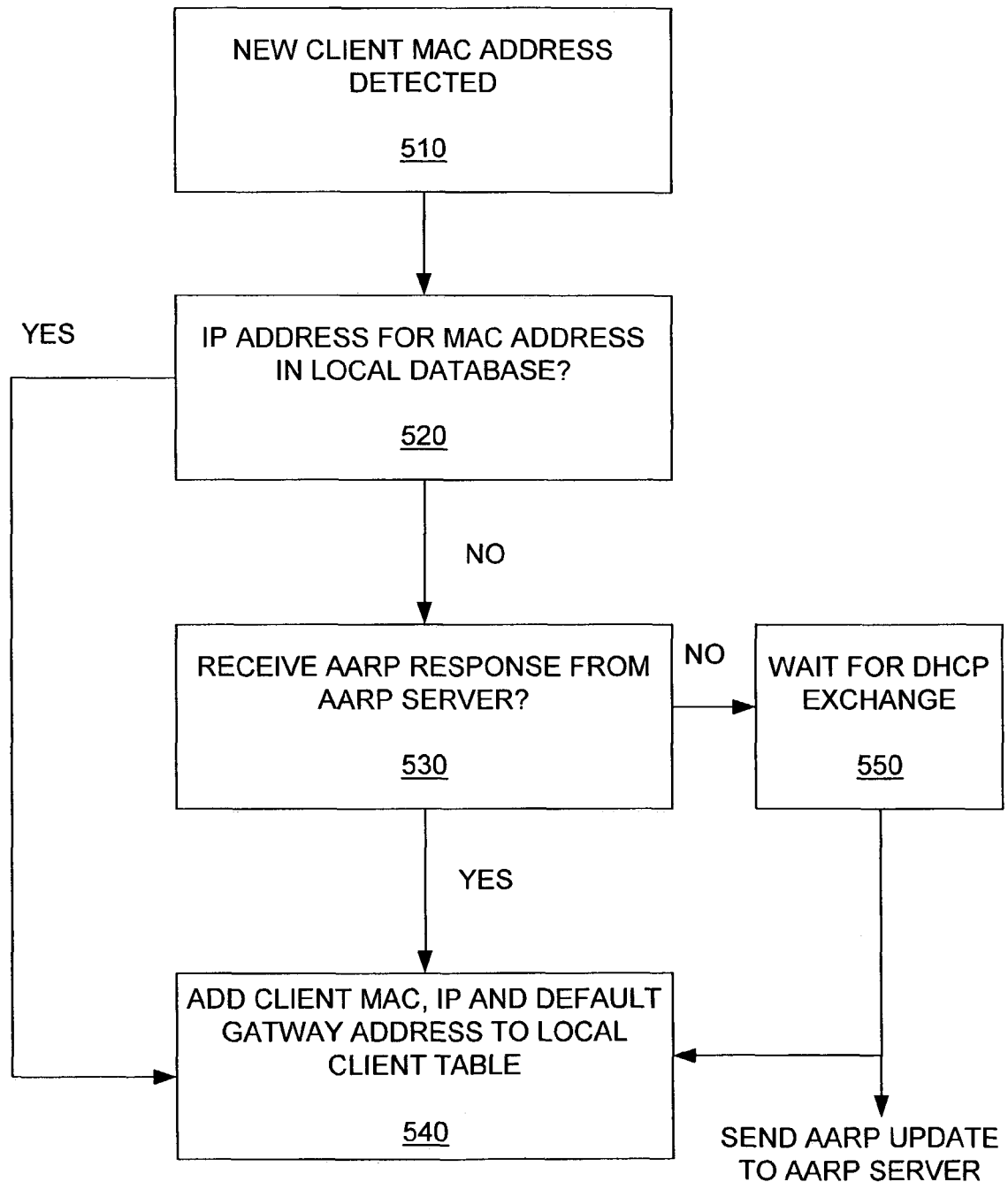
FIG. 5 shows a sequence of events for resolving a client's IP address at an access node according to an embodiment of the invention.

FIG. 5 shows a sequence of events for resolving a client's IP address at an access node according to an embodiment of the invention.

A first event 510 includes a new client MAC address being detected.

A second event 520 include inquiring whether an IP address for the new client MAC address is within a local database. If the IP address is within the local database, then a local client table can be updated with the client MAC address, the client IP address and the client default gateway (DG). If the IP address is not within the local database, then an AARP server can be queried.

A third event 530 includes receiving an AARP response from the AARP server. If a response is received, then the local database, then a fourth event 540 includes a local client table being updated with the client MAC address, the client IP address and the client default gateway (DG). If a response is not received, then a fifth event 550 includes waiting for a DHCP exchange from the new client. The client IP address and the client default gateway (DG) are obtained from the DHCP acknowledgement. When an exchange is received, the local client table can be updated with the client MAC address, the client IP address and the client default gateway (DG), and an AARP update is sent to the AARP server.

Figure 6:
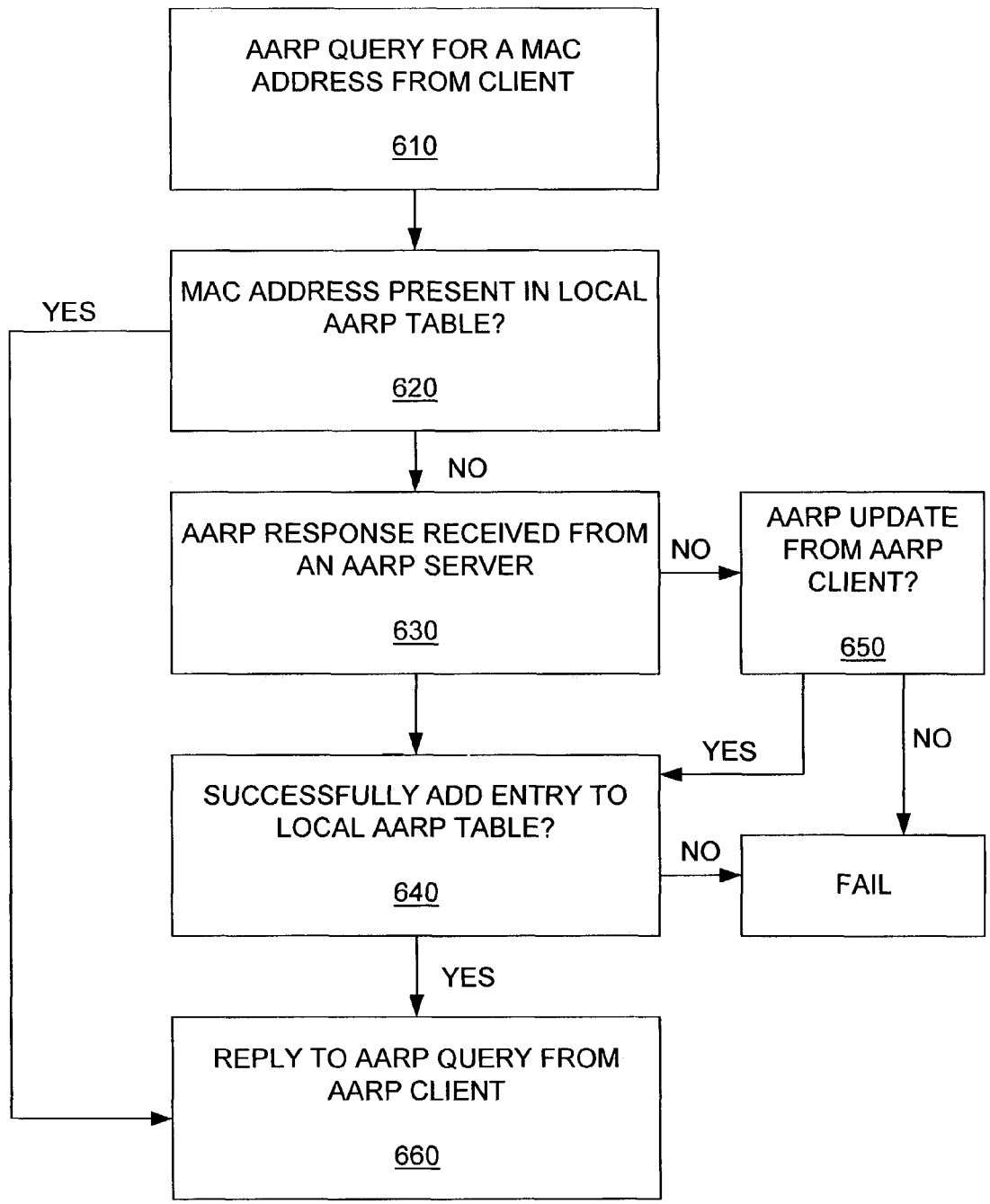
FIG. 6 shows a sequence of events for a MAC address query at a gateway according to an embodiment of the invention.

FIG. 6 shows a sequence of events for a MAC address query at a gateway according to an embodiment of the invention.

A first event 610 includes receiving an AARP query for a MAC address from an AARP client.

A second event 620 includes determining whether a MAC address is present in a local AARP table. If the MAC address is within the local AARP table, then a reply to the AARP query is sent to the AARP client. If the MAC address is not within the local AARP table, then an AARP query is generated for other AARP servers.

A third event 630 includes receiving an AARP response from an AARP server. If the response is received, then a fourth event 640 includes adding the MAC address as an entry to a local AARP table. If the response is not received, then the a fifth event 650 includes waiting for an AARP update from the client. If the AARP update is received the fourth step 640 is executed, and the MAC address is added as an entry to a local AARP table.

Another embodiment of the invention includes an access node pinging a broadcast address to determine IP addresses of client devices detected by the access node. The broadcast address can be pinged after the MAC address of the client device has been determined. The operating system of the client device must respond to broadcast pings.

Another embodiment of the invention includes the access node inspecting IP datagrams originating from a MAC address belonging to a client device in order to ascertain the device's IP address. This method generally requires the client device to generate traffic. This method can be rendered more efficient by only inspecting datagrams whose source MAC address does not correspond to an IP address of a client device that is known to be attached to the access node.

Another embodiment of the invention includes the access node can determining the IP address of an attached client device through an examination of its own ARP cache.

Client Information Parameters

In addition to the MAC and IP addresses of an attached client device, there are a few other parameters of operation that are relevant to the networking of a client device. These other parameters generally smooth uninterrupted operation of applications of the client device while roaming within an access network.

MAC Address of Client Device's Default Gateway (DG)

Some applications of a client device use the client device's default gateway's MAC address as the seed in the generation of an encryption key will reset themselves if the MAC address of the client device's default gateway appears to change. This reset implies an application failure that presents itself as an interruption of service to the end-user. Therefore, the network needs to present the client device with the appearance that the MAC address of the client device's default gateway does not change, regardless of the client device's position within the network, or roaming of the client device.

IP Address of Client Device's Default Gateway

Analogous to the situation described above, generally, the network must provide a single (and unchanged) default gateway IP address to the client device.

Length of DHCP Lease

The length of a DHCP lease allows the network to track the presence and status of the client device.

Time when the Client Device was Last Seen on the Network

Knowledge of the time when the client device was last seen on the network allows the network to track the presence and status of the client device.

For an embodiment, detecting the client includes determining client information parameters by at least one of determining a MAC address of client's default gateway, determining an IP address of client's default gateway, determining a length of a DHCP lease, determining a time the client was last on the network.

Accessing Client Information Parameters

The second act 320 of FIG. 3 includes obtaining client information.

The invention includes several different embodiments for maintaining information pertaining to a client. A first gateway within a same cluster as the first wireless access node can maintain information pertaining to the client. A gateway not within a same cluster as the first wireless access node can maintain information pertaining to the client. At least two gateways can maintain information pertaining to the client. A previously described network management system connected to a same cluster as the first wireless access node can maintain client parameter information The previously described, AARP is a protocol for resolving MAC addresses to IP addresses. The AARP is based on a client-server architecture. The AARP client sends an AARP request to the AARP server requesting the IP address and other relevant parameters corresponding to a given client device MAC address. The AARP server replies with an AARP response that contains the requested information.

Generally, the network architecture includes a distributed network of AARP servers that may query each other and synchronize their address mapping tables perodically or on-demand in order to satisfy AARP quenes.

In addition, an AARP client may send an AARP update to an AARP server to allow it to create new entries in the AARP mapping table. A similar asynchronous AARP update may be originated by an AARP server and sent to other AARP servers to trigger an update to their address mapping tables.

Access nodes will typically function as AARP clients and gateways typically function as AARP clients or servers, depending on the context.

Messaging between AARP clients and servers or between AARP servers can take place over UDP, TCP or other messaging protocols with an optional per-packet encryption using a symmetric key algorithm such as AES or 3DES or an asymmetric key algorithm such as RSA. Communication is also possible through IP-in-IP tunnels or other alternative means of communication. If an unreliable protocol such as UDP is used for messaging, the AARP application must implement reliability mechanisms such as retries.

The invention includes several different methods of obtaining client information. An embodiment includes an access node referencing at least one of a first gateway within the same cluster as the access node, or another gateway, to obtain client information regarding the client. The access node can obtain the client information from at least one of the gateways by sending an anti-ARP request. If a first requested gateway does not have the client information, then the first requested gateway can request the client information from another gateway. The requests of the first gateway can be transmitted over a back haul interface of the first gateway.

An embodiment includes the anti-ARP request being continuously re-transmitted until a response is received.

The invention includes several different methods in which a gateway can send request for client information from other gateways. A first embodiment includes the requests of the gateway being unicast as IP datagrams. Another embodiment includes the requests of the gateway can be multicast to other gateways. Another embodiment includes the requests of the first gateway can be broadcast to other gateways.

For an embodiment, if none of the gateways have information regarding the client, then information regarding the client is obtained by an access node querying a network interface card driver of the access node that is detecting the client. For another embodiment, if none of the gateways have information regarding the client, then an IP address of the client is obtained by at least one of; pinging the broadcast address, snooping IP datagrams originating from MAC address of client, inspecting a DHCP acknowledgment packet. For another embodiment, if none of the gateways have information regarding the client, then a default gateway IP address of the client is obtained by inspection of a DHCP acknowledgment packet.

The information of the gateways can be updated with the obtained client information.

Generation of AARP Table Entries on Gateways

AARP entries corresponding to client devices can be generated at the gateways according to one of several different methods.

A first method includes the gateway receiving an AARP query from an access node for the IP address corresponding to the MAC address of an attached client device. The gateway then queries the other gateways and receives an AARP Response from one (or more) of them with the corresponding IP address. The gateway then records the MAC and IP address (and other relevant parameters) into the address mapping table.

The gateway receives an AARP Update message from other gateways on the access network containing the relevant parameters for one or more client devices.

When a client device attaches to the access network for the first time, the client can request an IP address using DHCP. The access node to which the client device is attached can inspect the DHCP exchange and determine the IP address which the client device has accepted. The access node then sends an AARP update to its gateway informing it of the MAC-IP mapping and other relevant client device parameters. The gateway then records this information to an address mapping table of the gateway.

An embodiment of the invention includes a IP address that is consistent with a local subnet being dynamically obtained through DHCP. Another embodiment includes a default gateway IP address that is consistent with a local subnet being dynamically obtained through DHCP.

Notes on Addressing

All client devices on the network have IP addresses that are obtained through one of two different methods. A first method includes the IP address being dynamically assigned to the client device by a DHCP Server. A second method includes the IP address being statically assigned to the client device.

For each of the methods, the IP address of the client device should not match the subnet mask of the downlink interface(s) of the access nodes on the network. This inconsistency is resolved through the maintenance of host-specific routes to client devices, rather than subnet routes.

The use of subnet routes to route to client devices or other hosts is usual in a static networking environment. The rationale for using subnet routes is that a single route table entry for a subnet can address all hosts on the corresponding subnet. Therefore, the number of route table entries is kept to a minimum.

In a network where the client devices frequently change their point of attachment to the network, the IP addresses of a client device must change to reflect the subnet mask of the new point of attachment. However, this requires a new DHCP transaction. Additionally, this leads to disruption and resets of network sessions. In the context of Mobile IP, this problem is resolved by maintaining a set of two addresses: one that is dynamically obtained through DHCP and therefore, consistent with the local subnet; and another that remains fixed even as the client device roams. The fixed IP address is used as the termination point for all user sessions and the dynamic address is used to set up a tunnel to the Home Agent.

By using host-specific routes rather than subnet routes to route to the client devices, the problem of the consistency of the client IP address relative to the local subnet address scope, can be avoided.

An embodiment of the invention includes IP address of the client remaining fixed as the client roams. Another embodiment includes the default gateway IP address remaining fixed as the client roams. Another embodiment includes both the first IP address and the default gateway IP address remaining fixed as the client roams within a cluster, between clusters having a common subnet, and between clusters having different subnets.

Communications Path

The third act 330 of FIG. 3 includes the first wireless node providing the client a communication path to and from a destination. Generally, the communication path is able to include wired and wireless communication link.

The fourth act 340 of FIG. 3 includes aiding in a routing of information through the communication path between the client and the destination based upon detection of the client.

Generally, the several routes need to be set up within the network in order for the client device to communicate with other network entities. First of all, the client device needs to have a default gateway route. Additionally, each of the network elements through which traffic passes to the client device needs to have a route (either direct or indirect) to the client device. This assumes that Network Address Translation is not being performed within the network path under consideration. If NAT is being performed, each device intermediate between the client device and the device doing the NAT needs to have a route (direct or indirect) to the client device The default gateway route on a client device is usually set up either through DHCP assignment, or statically. Therefore, setting up routes to the client device within the access network is a primary issue.

The first steps in setting up routes to the client device includes detecting the MAC address of the client device, and determining the IP address of the client device.

Another step includes the access node sets up a direct route to the client device on its downlink interface.

Another step includes propagating the direct route through the rest of the access network. The propagation of the route usually takes place through the operation of a routing protocol such as RIP, OSPF, BGP or other.

Finally, each node on the path to the client device sets up a route in its route table that instructs it how to route packets destined for the client device. For example, a node B, adjacent to access node A, may set up an indirect route to client device C through A (where client device C is directly attached to access node A).

Figure 7:
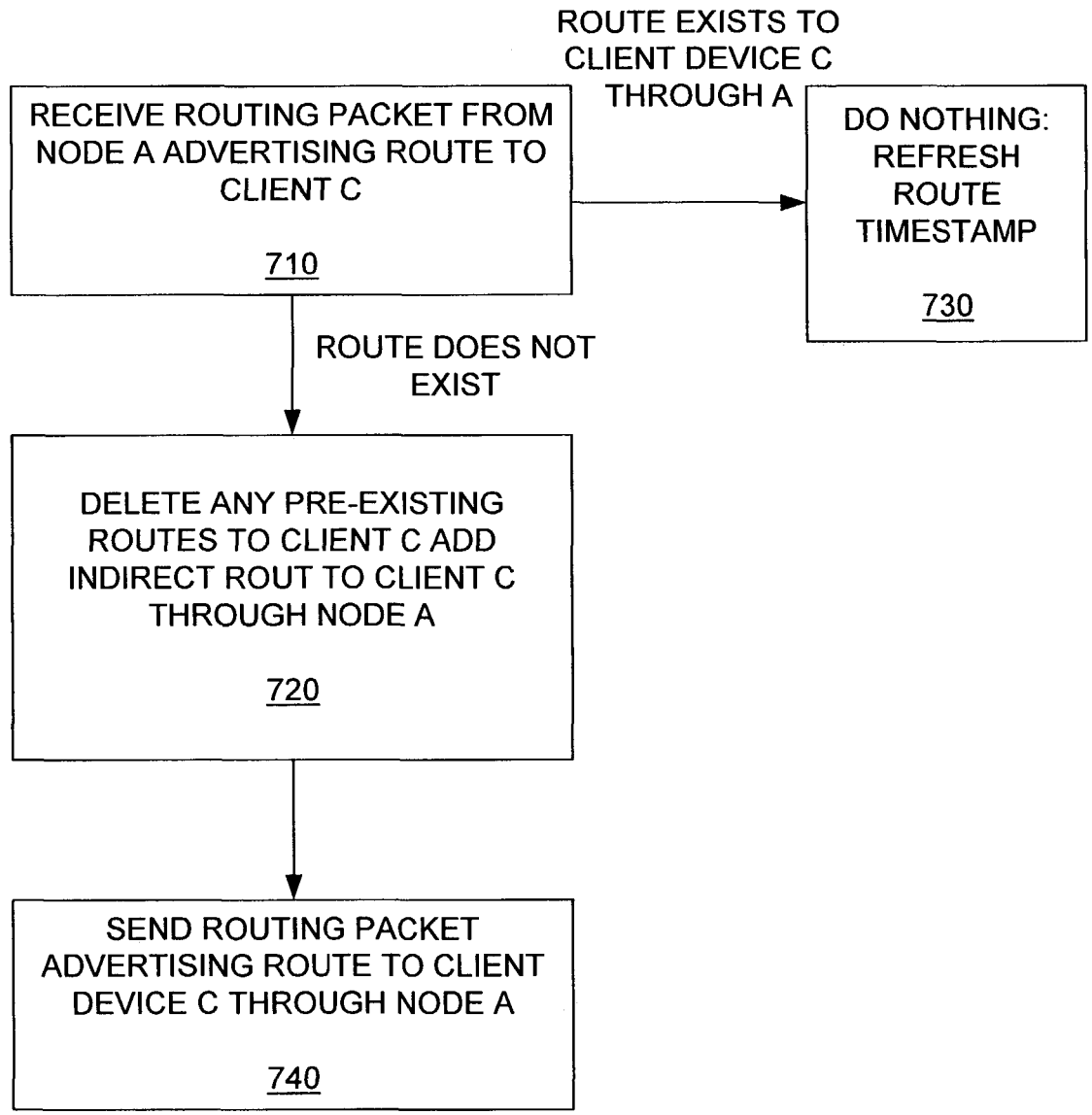
FIG. 7 shows a route addition on an access node when a client is not attached to the access node according to an embodiment of the invention.

FIG. 7 shows a route addition on an access node when a client is not attached to the access node according to an embodiment of the invention.

A first event 710 includes receiving a routing packet from a node A advertising a route to a client C. If a route already exists, nothing else is required. If a route does not exist, then a second event 720 is executed that includes deleting any pre-existing routes to client C, and adding an indirect route to client C through node A. If a route does exist, then a third event 730 includes doing nothing but refreshing a route timestamp.

A fourth event 740 includes sending a routing packet advertising a route to client C through node A.

Figure 8:
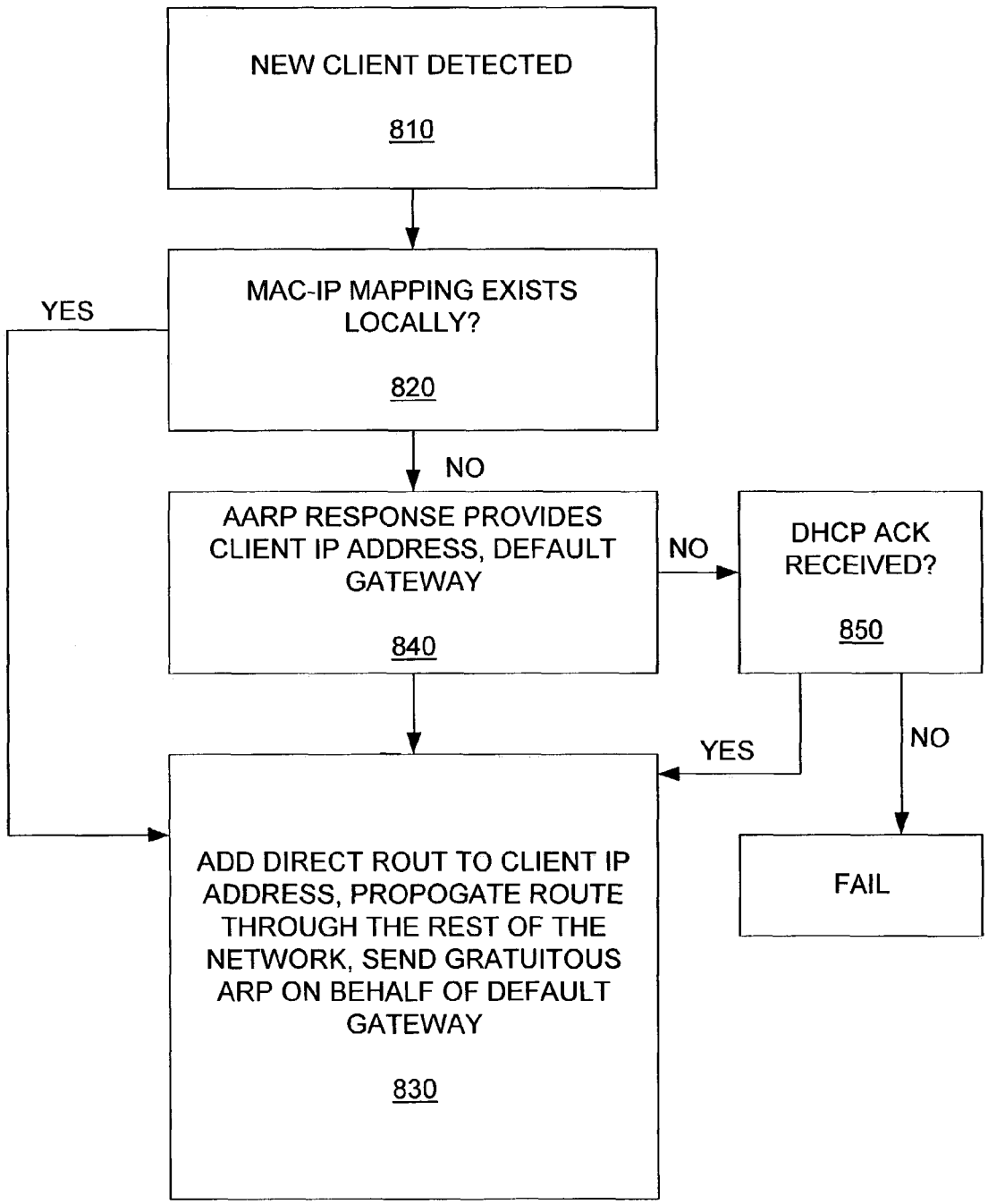
FIG. 8 shows a route addition on an access node when a client is not attached to the access node according to an embodiment of the invention.

FIG. 8 shows a route addition on an access node when a client is not attached to the access node according to an embodiment of the invention.

A first event 810 includes detecting a new client MAC address.

A second event 820 includes determining whether the MAC-IP mapping exists locally.

A third event 830 is executed if the MAC-IP mapping does exist locally, and includes adding a direct route to the client IP address, propagating the route through the rest of the network, and gratuitously sending an ARP on behalf of the gateway.

A fourth event 840 is executed if the MAC-IP mapping does not exist locally, and includes sending an AARP request to an AARP server.

A fifth event 850 includes waiting for an AARP response providing a client IP address and a default gateway. If an AARP response is received, then the third event 830 is executed by adding a direct route to the client IP address, propagating the route through the rest of the network, and gratuitously sending an ARP on behalf of the gateway. If a AARP response is not received, then a sixth event include analyzing a DHCP acknowledgement if received. If the acknowledgment is received, then the third event 830 is executed.

An embodiment of the invention includes aiding in a routing of information through the communication path between the client. The aiding can include updating a routing table for each of the access nodes and gateways that exist in the communication path between the first access node and the destination. Additionally, routing tables of other network elements on the backbone network may be updated.

Route-Setup at the Interface between the Access Network and the Backbone Network In order for the client device to be reachable from the backbone network, routes to the client device need to exist on the backbone network. An edge router can be utilized between the access network and the backbone network to allow the client to be reached by the backbone network. This connection between the client and the backbone can be advertised or propagated within the backbone network through standard mechanisms such as route advertisements using standard protocols such as BGP.

Typically, there will be a subnet route on the edge router on the port to which the segment of the Access Network is attached. All IP addresses within this subnet will be assumed (by the Edge Router) to be directly reachable. However a client device with an IP address-on this subnet may actually only be reachable through multiple hops, at least one of which traverses a gateway. Therefore the gateway shall "proxy ARP" over its uplink Interface on behalf of all IP addresses to which it has a route on its downlink interface(s). In this way, no special routing needs to occur in order for the client device to be reachable from the backbone network.

When a client device switches from one cluster to another while remaining on the same subnet (i.e., switches between clusters whose gateways are attached to the same subnet), the gateway to the cluster that it has just joined sends one or more "gratuitous ARPs" on behalf of this client device, and starts proxy ARPing on behalf of this client device since it now has a route to the client device on one of its downlink interfaces. The gateway of the cluster from which the client device roamed stops proxy ARPing on behalf of this client device since its route to the client device on its downlink interface has now disappeared.

When a client device switches between clusters that are not on the same subnet, the gateway of the cluster to which it used to belong continues to proxy ARP on its behalf because the route to the client device on its Downlink Interface has now been replaced by a route to the client device over its tunnel interface (which is treated as another Downlink Interface).

An embodiment includes the gateway providing a proxy ARP so that a device outside of the wireless system can be spoofed into sending frames addressed to the client IP address to the first gateways MAC address.

An embodiment includes a second gateway providing an ARP to an edge router upon the client switching from a first cluster to a second cluster so that an ARP cache within the edge router can be updated.

Maintaining Fixed Client Information Parameters as the Client Roams

Embodiments of the invention include at least some client information parameters remaining fixed as the client device roams. An embodiment includes an IP address being statically assigned. An embodiment includes the client IP address remaining fixed as the client roams. An embodiment includes a default gateway IP address remaining consistent with a local subnet being dynamically obtained through DHCP. An embodiment includes a default gateway IP address that is consistent with a local subnet being dynamically obtained through DHCP. An embodiment includes the default gateway IP address remains fixed as the client roams. An embodiment includes both the first IP address and the default gateway IP address remaining fixed as the client roams within a cluster, between clusters having a common subnet, between clusters having different subnets.

Addressing Application Support Requirements

Certain commonly-used applications impose specific requirements that can invalidate a roaming/handoff configuration. This is because some applications are dependent on the values of certain networking parameters associated to client devices. These applications can reset, fail or timeout in response to changes in these parameters. Therefore, it is important to ensure that these critical parameters do not change as the client device roams through the network.

A simple example is an IP address of a client device. If the IP address of the client device changes, any TCP or UDP sessions in progress are lost and have to be restarted. All associated data can potentially be lost and the application may have to be manually restarted. This can adversely affect an end-user experience. This problem is solved through Mobile IP, which maintains a constant Home Address while adapting the Care-Of Address to the local subnet in which the client device currently is.

Other client device parameters changes that may affect application session-persistence include a client device's default gateway's IP address, and Client Device's Access Node's MAC address.

Some applications (such as VPNs, SSH, SSL) use the client device's default gateway's IP address and/or MAC address as seeds to generate the application encryption keys. If these addresses change, the application resets, resulting in loss of the session.

Figure 9:
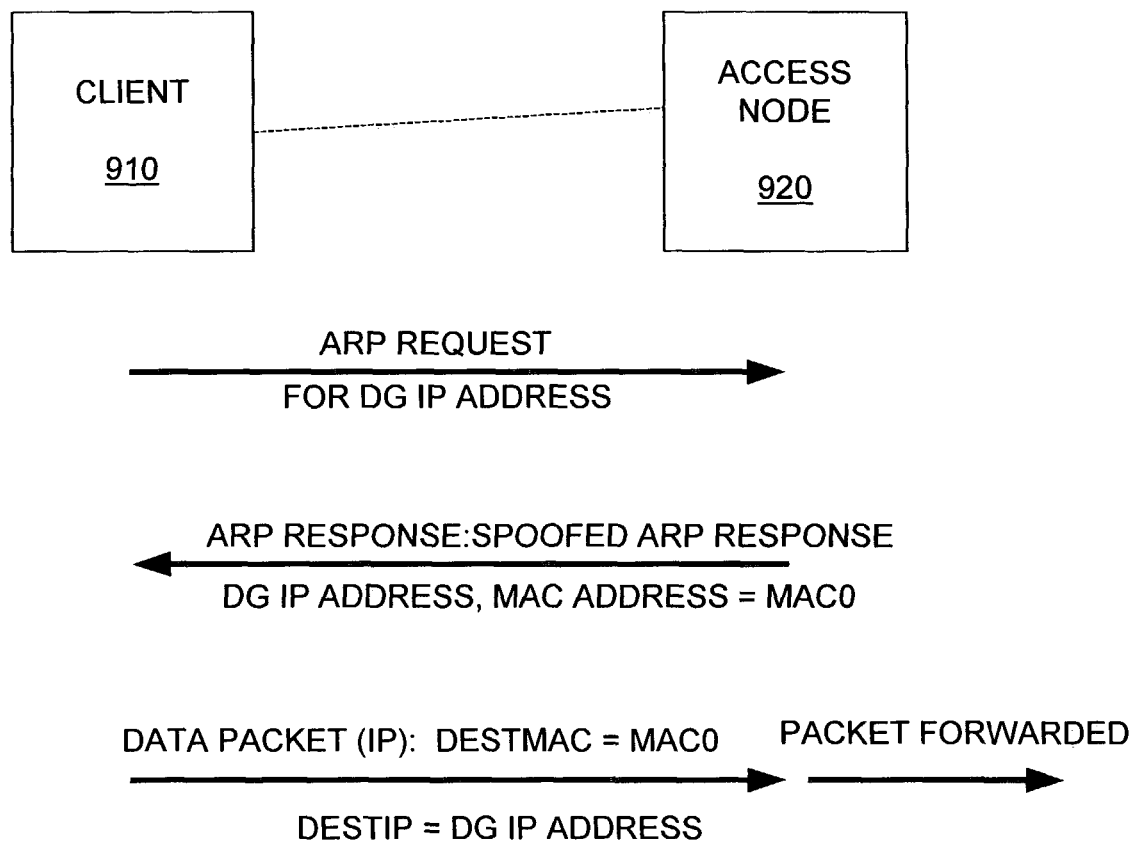
FIG. 9 shows a sequence events of a spoofed ARP according to an embodiment of the invention.

FIG. 9 shows a sequence events of a spoofed ARP according to an embodiment of the invention. The sequence of events include interactions between a client device 910 and an access node 920.

A valid MAC address that is a fixed address throughout the access network can be designated as a "Common MAC Address". This address generally should not be the MAC address of any real device within the access network. When a client device 910 sends an ARP request to resolve the MAC address of a host on its subnet or the MAC address of its default gateway, the access node 920 responds with an ARP response indicating that the requested IP address has a MAC address which is the same as the common MAC Address (we will refer to this as a Spoofed ARP Response). In this way, all frames from a client device to a host within its subnet are addressed (at the MAC Layer) to the Common MAC Address. The access nodes are programmed to accept any frames addressed (at the MAC Layer) to the Common MAC Address and treat them exactly as if they were frames addressed to the MAC address of the Downlink Interface on which they were received. This procedure ensures that the ARP cache entries on the Client Device never change while it is within the Access Network even as it roams from one Access Node to another. This allows for the maintenance of application sessions as the client device roams within th e access network, since the application may be sensitive to the MAC address of the point of attachment.

When a client device first attaches itself to an access node, the access node can detect the client device and determine its MAC address, IP address and its default gateway's IP address, as previously described. The access node can then generate one (or more than one, to guard against packet losses) Spoofed ARP responses advising the client device that its default gateway's MAC address is the same as the Common MAC address.

Figure 10:
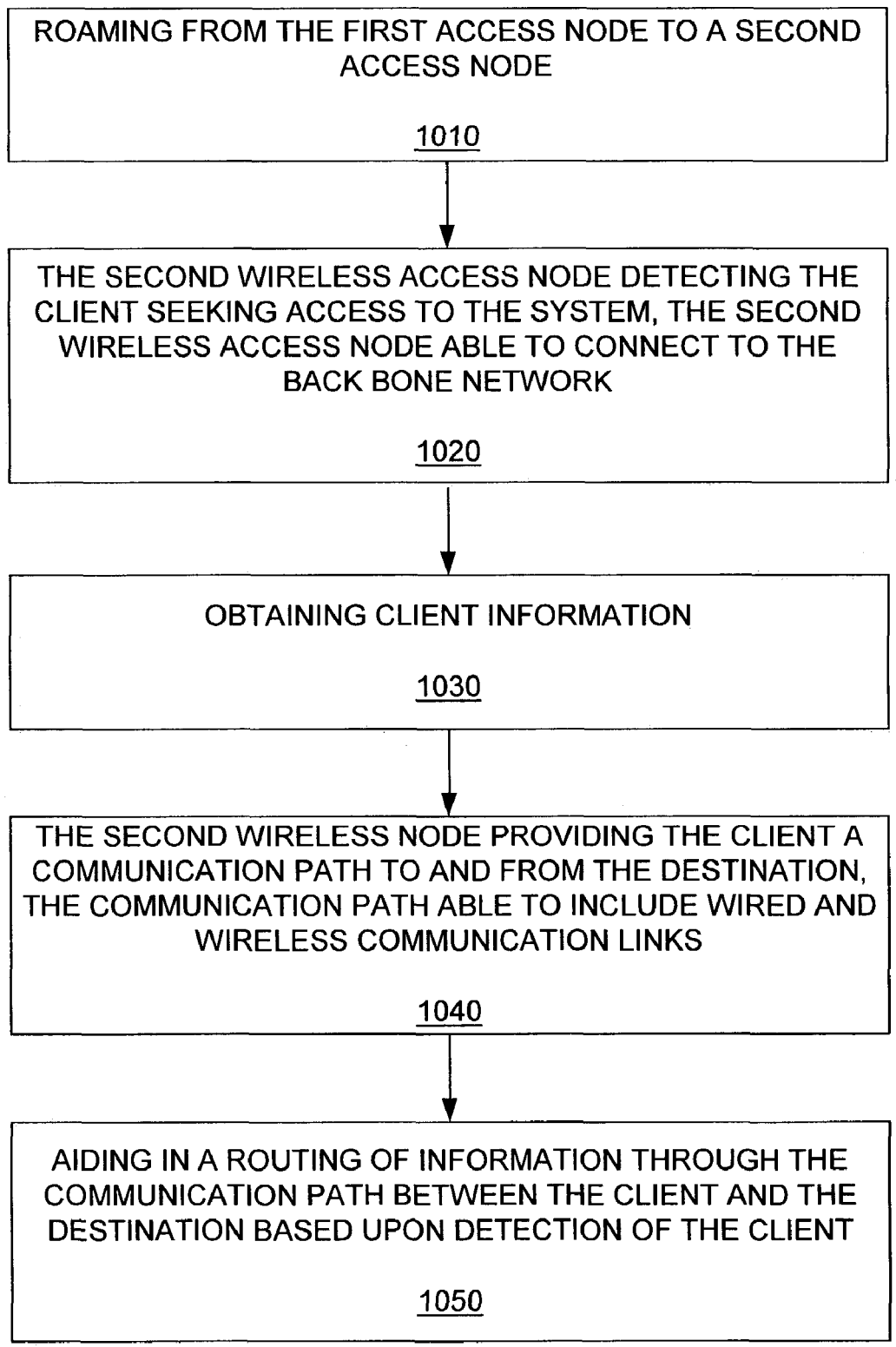
FIG. 10 is another flow chart that includes acts according to another embodiment of the invention.

FIG. 10 is another flow chart that includes acts according to another embodiment of the invention Generally, this embodiment includes the client roaming from the first access node to the second access node. An embodiment includes the wireless connection between the second access node and the back bone network including at least one wireless hop between the second access node and a fourth access node. Another embodiment includes the second wireless access node being a second gateway that is linked to a computer network through a wired connection.

Roaming

A first act 1010 of FIG. 10 includes the client roaming from the first access node to the second access node. An embodiment includes the second wireless access node allowing the client to maintain a same default gateway IP address as client roams from the first wireless access node. Another embodiment includes the second wireless access node allowing the client to maintain a same default gateway MAC address as client roams from the first wireless access node.

A second act 1020 includes the second wireless access node detecting the client seeking access to the system. Generally, the second wireless access node is able to connect to the back bone network. The methods of detection of the second act 1020 can include the embodiments previously described for detecting the client.

A third act 1030 includes obtaining client information.

A fourth act 1040 includes the second wireless node providing the client a communication path to and from the destination, the communication path able to include wired and wireless communication links.

A fifth act 1050 includes aiding in a routing of information through the communication path between the client and the destination based upon detection of the client.

Descriptions of Particular Roaming Situations

New Client

Generally, when a client device appears onto the access network for the first time, it issues a DHCP discover upon boot-up. The DHCP transaction, conducted with a DHCP server, involves a four-way handshake comprising a DHCP discover, a DHCP offer, a DHCP request and a DHCP ACK. Each of these DHCP transactions occur through mediation of a DHCP relay co-located with the access node. The access node intercepts the DHCP ACK packet and determines the client device's IP address and its default gateway's IP address.

An embodiment includes the determined addresses being used to populate an AARP update that is sent to the access node's gateway. The gateway can record the client device's MAC and IP addresses and its default gateway's IP address in addition to a timestamp in its address mapping table.

The access node then adds a direct route to the client device on its Downlink Interface, propagates this route throughout the access network, and gratuitously ARPs on behalf of the default gateway IP address.

Client Device Roaming within a Cluster

When the client device roams to another access node served by the same gateway, the new access node detects the client device's MAC address using one of the mechanisms previously described. The new access node then sends an AARP Request to the gateway for the client cevice's other parameters. The gateway references its address mapping table and replies with an AARP response containing the client device's IP address, its default gateway's IP address and other relevant parameters.

The new access node records the information from the AARP Response, adds a direct route to the client device on its Downlink Interface, propagates the new route throughout the access network and starts gratuitously ARP'ing on behalf of the client device's default gateway's IP address. The new route propagates through the network and the old direct route from the old access node to the client device is deleted and all existing routes within the access network to the client device are reset.

Any traffic en route to the client device while it is roaming between access nodes is rerouted to the new access node based on the changes to the route tables throughout the access network.

Client Device Roaming between Clusters

When a client device roams to an access node that is served by a different gateway, the new access node sends an AARP Request to its gateway requesting the client device's information parameters. The gateway references its address mapping table, and finds no corresponding entry, and sends an AARP Request to the other gateways. The gateway serving the previous access node to which the client device was previously attached responds to this AARP Request with the client device's parameters. The new gateway can send an AARP response to the new access node which then adds a direct route to the client device, propagates the new direct route throughout the access network and starts gratuitously ARP'ing on behalf of the client device's default gateway's IP address.

Any traffic en route to the client device while it is roaming between clusters is routed to the gateway of the original cluster. Since the access node now belongs to a new cluster, this traffic is rerouted to the new cluster. Since different clusters may be on different segments or subnets that are not directly connected, this traffic must pass through an IP-in-IP tunnel between the gateways of the two clusters. Upon emergence from the tunnel, the traffic is routed as usual to the access node to which the client device is attached, and therefore, to the client device itself.

As will be described, IP-in-IP tunnels between gateways can be set up, maintained and torn down.

Messaging between Clusters

Different clusters can be located on different subnets, or physically separated network segments. When traffic for a client device is received at a gateway which does not service the access node to which the client device is currently attached, the traffic needs to be rerouted to the gateway of the appropriate cluster. Since the clusters may be on different subnets, this rerouting must occur through an IP-in-IP encapsulated tunnel.

A Network Management System (NMS) can maintain a list of all gateways in the access network system. When a client device roams from one cluster to another, the NMS instructs the gateways of the two clusters to create an IP-in-IP tunnel to each other. When data traffic for the client device is received at the old gateway, it can be encapsulated within another IP datagram with destination IP address the same as the other gateway (the gateway of the cluster to which the client device is currently attached) and routed through the tunnel. At the other end of the tunnel, the new gateway decapsulates the datagram by stripping off the outer IP header and routes the (decapsulated) packet based on its destination IP address (which is the IP address of the client device).

If a tunnel is inactive for a long period of time, the NMS can instruct the tunnel end-points to tear down the tunnel in order to reduce the tunnel maintenance overhead. In this way, tunnel creation, maintenance and termination are centrally controlled by an NMS.

In addition, each gateway can be informed of the IP addresses of all other gateways by the NMS. When a gateway needs to send an AARP Request to the other gateways, it sends unicast datagrams to all the other gateways of which it has been notified by the NMS. In the case where all the gateways are on the same network segment, the network overhead incurred by these serial unicasts may be reduced by sending a single AARP request to the broadcast IP address instead. AARP replies, however, are always unicast to the requester.

An Example of Roaming between Clusters: Roaming between Gateways

A gateway can also be an access node. Therefore, client devices can attach directly to a gateway. A client device C that is directly attached to gateway A can roam into a neighboring cluster and attach directly to another gateway B.

When a client device C is detected at gateway B, a local AARP Client Process on Gateway B sends an AARP Request to the AARP Server Process (on Gateway B). The AARP Server Process then sends off an AARP Request to the other Gateways in the Access Network. Gateway A, to which Client Device C was last attached, responds with an AARP Response to the AARP Server process on Gateway B. The AARP Server process on Gateway B then sends an AARP Response to the local AARP Client Process with the client's parameters. A route is then added to C at Gateway B, which then sens off an AARP Update packet to all other Gateways on the Access Network. Gateway A, receiving this AARP Update, deletes its direct route to Client Device C and replaces it with-a route to C over the inter-Cluster tunnel to Gateway B. Packets that are subsequently received at Gateway A for Device C are routed over the tunnel to Gateway B and thence to Device C.

An embodiment includes an IP-in-IP tunnel being created between a first gateway of the first cluster and a second gateway of the second cluster. An embodiment includes the first cluster being connected to a first subnet, and the second cluster being connected to a second subnet, and information destined for the client through the first gateway being rerouted to the second gateway through an IP-in-IP encapsulated tunnel.

An embodiment includes the first gateway and the second gateway being maintained by a network management system. The network management system can control creation, maintenance, and removal, of an IP-in-IP tunnel formed between the first gateway and the second gateway.

An embodiment includes data traffic for the client being received by the first gateway, encapsulated within an IP datagram having a same destination IP address as the second gateway, and being routed through the tunnel. An embodiment includes the second gateway decapsulating the IP datagram by stripping an IP header, and routing the data traffic based upon an IP destination address.

Although specific embodiments of the invention have been described and illustrated, the invention is not to be limited to the specific forms or arrangements of parts so described and illustrated. The invention is limited only by the appended claims.

What is claimed:

1. A method of allowing a client to access a wireless system, the system comprising at least a first wireless access node, the method comprising:
   the first wireless access node detecting the client seeking access to the system, the first wireless access node able to wirelessly connect to a back bone network;
   the first wireless access node obtaining client information, the client information comprising an IP address of the client's default gateway, and the client's IP address, wherein the IP address of the client's default gateway is obtained by the first wireless access node by intercepting and inspecting a DHCP acknowledgement packet, and wherein the client's IP address is also obtained by the first wireless access node by interception and inspection of the DHCP acknowledgment packet;
   the first wireless access node providing the client a first communication path to and from a destination, the first communication path able to include wired and wireless communication links; and
   aiding in routing of information through the first communication path between the client and the destination based upon detection of the client.

2. The method of allowing a client to access a wireless system of claim 1, wherein the wireless connection between the first wireless access node and the back bone network comprises at least one wireless hop between the first wireless access node and a third access node.

3. The method of allowing a client to access a wireless system of claim 1, further comprising:
   the client roaming from the first wireless access node to a second wireless access node;
   the second wireless access node detecting the client seeking access to the system, the second wireless access node able to connect to the back bone network;
   obtaining client information;
   the second wireless access node providing the client a second communication path to and from the destination, the second communication path able to include wired and wireless communication links; and
   aiding in routing of information through the second communication path between the client and the destination based upon detection of the client.

4. The method of allowing a client to access a wireless system of claim 3, wherein the wireless connection between the second access node and the back bone network comprises at least one wireless hop between the second access node and a fourth access node.

5. The method of allowing a client to access a wireless system of claim 3, wherein the first wireless access node and the second wireless access node belong to a common cluster.

6. The method of allowing a client to access a wireless system of claim 3, wherein the first wireless access node belong to a first cluster, and the second wireless access node belongs to a second cluster.

7. The method of allowing a client to access a wireless system of claim 6, wherein the first cluster is connected to a first subnet, and the second cluster is connected to a second subnet.

8. The method of allowing a client to access a wireless system of claim 3, wherein the second wireless access node allows the client to maintain a same default gateway IP address as client roams from the first wireless access node.

9. The method of allowing a client to access a wireless system of claim 3, wherein the second wireless access node allows the client to maintain a same default gateway MAC address as client roams from the first wireless access node.

10. The method of allowing a client to access a wireless system of claim 1, wherein a first gateway maintains information pertaining to the client.

11. The method of allowing a client to access a wireless system of claim 10, wherein the first gateway is within a same cluster as the first wireless access node.

12. The method of allowing a client to access a wireless system of claim 1, wherein at least a third gateway not within a same cluster as the first wireless access node maintains information pertaining to the client.

13. The method of allowing a client to access a wireless system of claim 1, wherein at least two gateways maintain client information parameters.

14. The method of allowing a client to access a wireless system of claim 3, wherein at least two gateways maintain client information parameters.

15. The method of allowing a client to access a wireless system of claim 1, wherein a network management system connected to the wireless system maintains information pertaining to the client.

16. The method of allowing a client to access a wireless system of claim 3, wherein a second gateway within a same cluster as the second wireless access node maintains information pertaining to the client.

17. The method of allowing a client to access a wireless system of claim 1, wherein the first wireless access node references at least one of: a first gateway within a same cluster as the first wireless access node, and a third gateway, to obtain client information regarding the client.

18. The method of allowing a client to access a wireless system of claim 1, wherein the first wireless access node obtains the client information from a gateway by sending an anti-ARP request.

19. The method of allowing a client to access a wireless system of claim 1, wherein if a first requested gateway does not have the client information, then the first requested gateway requests the client information from another gateway.

20. The method of allowing a client to access a wireless system of claim 19, wherein the requests of the first gateway can be transmitted over a back haul interface of the first gateway.

21. The method of allowing a client to access a wireless system of claim 19, wherein the requests of the first gateway can be unicast as IP datagrams.

22. The method of allowing a client to access a wireless system of claim 19, wherein the requests of the first gateway can be multicast to other gateways.

23. The method of allowing a client to access a wireless system of claim 19, wherein the requests of the first gateway can be broadcast to other gateways.

24. The method of allowing a client to access a wireless system of claim 18, wherein the anti-ARP request is continuously re-transmitted until a response is received.

25. The method of allowing a client to access a wireless system of claim 17, wherein if none of the gateways have information regarding the client, then information regarding the client is obtained by the first wireless access node querying a network interface card driver of the access node that is detecting the client.

26. The method of allowing a client to access a wireless system of claim 17, wherein if none of the gateways have information regarding the client, then an IP address of the client is obtained by the first wireless access node by at least one of: pinging the broadcast address, snooping IP datagrams originating from MAC address of client, the first wireless access node inspecting a DHCP acknowledgment packet.

27. The method of allowing a client to access a wireless system of claim 26, wherein information of a second gateway is updated with the obtained client information.

28. The method of allowing a client to access a wireless system of claim 17, wherein if none of the gateways have information regarding the client, then a default gateway IP address of the client is obtained by interception and inspection by the first wireless access node of a DHCP acknowledgment packet sent to the client.

29. The method of allowing a client to access a wireless system of claim 10, wherein the first gateway can provide a proxy ARP so that a device outside of the wireless system can be spoofed into sending frames addressed to the client IP address to the MAC address of the first gateway.

30. The method of allowing a client to access a wireless system of claim 6, wherein a second gateway gratuitously sends an APP to an edge router upon the client switching from a first cluster to a second cluster so that an ARP cache within the edge router can be updated.

31. The method of allowing a client to access a wireless system of claim 6, wherein an IP-in-IP tunnel is created between a first gateway of the first cluster and a second gateway of the second cluster.

32. The method of allowing a client to access a wireless system of claim 31, wherein the first cluster is connected to a first subnet, and the second cluster is connected to a second subnet, and information destined for the client through the first gateway is rerouted to the second gateway through an IP-in-IP encapsulated tunnel.

33. The method of allowing a client to access a wireless system of claim 31, wherein the first gateway and the second gateway are maintained by a network management system, and the network management system controls creation, maintenance, and removal, of an IP-in-IP tunnel formed between the first gateway and the second gateway.

34. The method of allowing a client to access a wireless system of claim 31, wherein data traffic for the client is received by the first gateway, encapsulated within an IP datagram having a same destination IP address as the second gateway, and routed through the tunnel.

35. The method of allowing a client to access a wireless system of claim 34, wherein the second gateway decapsulates the IP datagram by stripping an IP header, and routes the data traffic based upon an IP destination address.

36. The method of allowing a client to access a wireless system of claim 1, wherein the first IP address remains fixed as the client roams.

37. The method of allowing a client to access a wireless system of claim 36, wherein a default gateway IP address that is consistent with a local subnet is dynamically assigned to the client by the DHCP server.

38. The method of allowing a client to access a wireless system of claim 37, wherein the default route on the client device remains fixed as the client roams.

39. The method of allowing a client to access a wireless system of claim 38, wherein both the first IP address and the default gateway route on the client device remain fixed as the client roams within a cluster, both the first IP address and the default gateway route on the client device remain fixed as the client roams between clusters having a common subnet, both the first IP address and the default gateway route on the client device remain fixed as the client roams between clusters having different subnets.

40. The method of allowing a client to access a wireless system of claim 38, wherein the default gateway route on the client device remain fixed as the client roams within a cluster, the default gateway route on the client device remain fixed as the client roams between clusters having a common subnet, and the default gateway route on the client device remain fixed as the client roams between clusters having different subnets.

41. The method of allowing a client to access a wireless system of claim 1, wherein both the first IP address and the default gateway route on the client device remain fixed as the client roams within a cluster, between clusters having a common subnet, between clusters having different subnets.

42. The method of allowing a client to access a wireless system of claim 1, wherein aiding in a routing of information through the communication path between the client includes updating a routing table for each of the access nodes and gateways that exist in the communication path between the first wireless access node and the destination.

43. The method of allowing a client to access a wireless system of claim 1, wherein routing tables of other network elements on the backbone network may be updated.

44. The method of allowing a client to access a wireless system of claim 10, wherein the client information expires out of the first gateway database unless the client information is periodically refreshed.

45. A wireless system, the system comprising at least a first wireless access node, the system further comprising:
   means for the first wireless access node detecting a client seeking access to the system, the first wireless access node able to wirelessly connect to a back bone network;
   means for the first wireless access node obtaining client information, the client information comprising an IP address of the client's default gateway, and the client's IP address, wherein the IP address of the client's default gateway is obtained by the first wireless access node by intercepting and inspecting a DHCP acknowledgement packet, and wherein the client's IP address is also obtained by the first wireless access node by interception and inspection of the DHCP acknowledgment packet;
   means for the first wireless access node providing the client a first communication path to and from a destination, the first communication path able to include wired and wireless communication links; and
   means for the first wireless access node aiding in routing of information through the first communication path between the client and the destination based upon detection of the client.

46. The wireless system of claim 45, wherein the wireless connection between the first wireless access node and the back bone network comprises at least one wireless hop between the first wireless access node and a third access node.

47. The wireless system of claim 45, further comprising:
   means for allowing the client to roam from the first wireless access node to a second wireless access node;
   means for the second wireless access node detecting the client seeking access to the system, the second wireless access node able to connect to the back bone network;
   means for the second wireless access node for obtaining client information;
   means for the second wireless node providing the client a second communication path to and from the destination, the second communication path able to include wired and wireless communication links; and
   means for the second wireless access node aiding in a routing of information through the second communication path between the client and the destination based upon detection of the client.

48. The method of allowing a client to access a wireless system of claim 47, wherein the wireless connection between the second wireless access node and the back bone network comprises at least one wireless hop between the second wireless access node and a fourth access node.

49. A first wireless access node, the first wireless access node comprising:
   means for detecting a client seeking access to the system, the first wireless access node able to wirelessly connect to a back bone network;
   means for obtaining client information, the client information comprising an IP address of the client's default gateway and the client's IP address, wherein the IP address of the client's default gateway is obtained by the first wireless access node by intercepting and inspecting a DHCP acknowledgement packet, and wherein the client's IP address is also obtained by the first wireless access node by interception and inspection of the DHCP acknowledgment packet;
   the first wireless access node including means for providing the client a first communication path to and from a destination, the first communication path able to include wired and wireless communication links; and
   means for aiding in a routing of information through the first communication path between the client and the destination based upon detection of the client.

50. The method of allowing a client to access a wireless system of claim 38, wherein an ARP cache entry on the client does not change as the client roams.

51. The method of allowing a client to access a wireless system of claim 50, wherein both the first IP address and the default gateway route on the client device remain fixed as the client roams within a cluster, between clusters having a common subnet, between clusters having different subnets.

52. A method of allowing a client to access a wireless system, the system comprising at least a first wireless access node, the method comprising:
   the first wireless access node detecting the client seeking access to the system, the first wireless access node able to wirelessly connect to a back bone network;
   the first wireless access node obtaining client information, the client information comprising an IP address of the client's default gateway, wherein the IP address of the client's default gateway is assigned to the client by a DHCP server;
   the first wireless access node providing the client a first communication path to and from a destination, the first communication path able to include wired and wireless communication links; and
   aiding in routing of information through the first communication path between the client and the destination based upon detection of the client;
   wherein the first wireless access node obtains the client information from a gateway by sending an anti-ARP request, if no gateway referenced by the first wireless access node have information regarding the client, then a default gateway IP address of the client is obtained by interception and inspection by the first wireless access node of a DHCP acknowledgment packet sent to the client.

53. The method of allowing a client to access a wireless system of claim 52, wherein a first gateway maintains information pertaining to the client.

54. The method of allowing a client to access a wireless system of claim 53, wherein the first gateway is within a same cluster as the first wireless access node.

55. The method of allowing a client to access a wireless system of claim 53, wherein at least a third gateway not within a same cluster as the first wireless access node maintains information pertaining to the client.

56. The method of allowing a client to access a wireless system of claim 53, wherein at least two gateways maintain client information parameters.

57. The method of allowing a client to access a wireless system of claim 53, wherein a network management system connected to the wireless system maintains information pertaining to the client.

58. The method of allowing a client to access a wireless system of claim 53, wherein the first wireless access node references at least one of: a first gateway within a same cluster as the first wireless access node, and a third gateway, to obtain client information regarding the client.

59. The method of allowing a client to access a wireless system of claim 53, wherein the first wireless access node obtains the client information from a gateway by sending an anti-ARP request.

60. The method of allowing a client to access a wireless system of claim 53, wherein if a first requested gateway does not have the client information, then the first requested gateway requests the client information from another gateway.

61. The method of allowing a client to access a wireless system of claim 60, wherein the requests of the first gateway can be transmitted over a back haul interface of the first gateway.

62. The method of allowing a client to access a wireless system of claim 60, wherein the requests of the first gateway can be unicast as IP datagrams.

63. The method of allowing a client to access a wireless system of claim 60, wherein the requests of the first gateway can be multicast to other gateways.

64. The method of allowing a client to access a wireless system of claim 60, wherein the requests of the first gateway can be broadcast to other gateways.

65. The method of allowing a client to access a wireless system of claim 59, wherein the anti-ARP request is continuously re-transmitted until a response is received.

66. The method of allowing a client to access a wireless system of claim 59, wherein if none of the gateways have information regarding the client, then information regarding the client is obtained by the first wireless access node querying a network interface card driver of the access node that is detecting the client.

67. The method of allowing a client to access a wireless system of claim 59, wherein if none of the gateways have information regarding the client, then an IP address of the client is obtained by the first wireless access node by at least one of: pinging the broadcast address, snooping IP datagrams originating from MAC address of client, the first wireless access node inspecting a DHCP acknowledgment packet.

68. The method of allowing a client to access a wireless system of claim 67, wherein information of a second gateway is updated with the obtained client information.

69. The method of allowing a client to access a wireless system of claim 59, wherein if none of the gateways have information regarding the client, then a default gateway IP address of the client is obtained by interception and inspection by the first wireless access node of a DHCP acknowledgment packet sent to the client.

70. A method of allowing a client to access a wireless system, the system comprising at least a first wireless access node, the method comprising:
  the first wireless access node detecting the client seeking access to the system, the first wireless access node able to wirelessly connect to a back bone network, wherein detecting the client comprises the first wireless access node detecting a MAC address of the client, the first wireless access node determining an IP address of the client from the MAC address of the client, the first wireless access node determining client information parameters comprising a MAC address of client's default gateway, and an IP address of the client;
  the first wireless access node obtaining client information, the client information comprising an IP address of the client's default gateway, wherein the IP address of the client's default gateway is assigned to the client by a DHCP server;
  the first wireless access node providing the client a first communication path to and from a destination, the first communication path able to include wired and wireless communication links; and
  aiding in routing of information through the first communication path between the client and the destination based upon detection of the client.

* * * * *